June 27, 1950    S. ROBERTS    2,513,205
ROTATABLE JOINT FOR RADIO WAVE GUIDE SYSTEMS
Filed Nov. 19, 1943    2 Sheets-Sheet 2
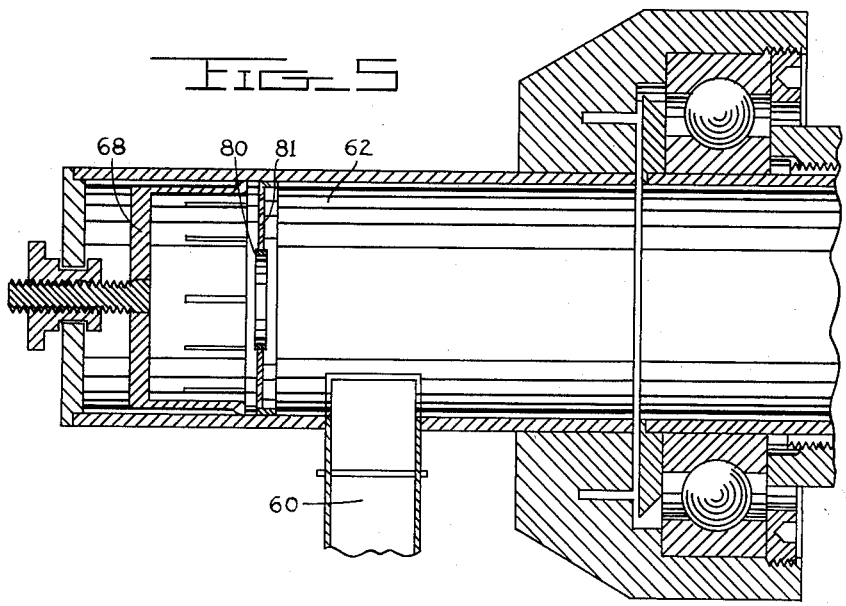
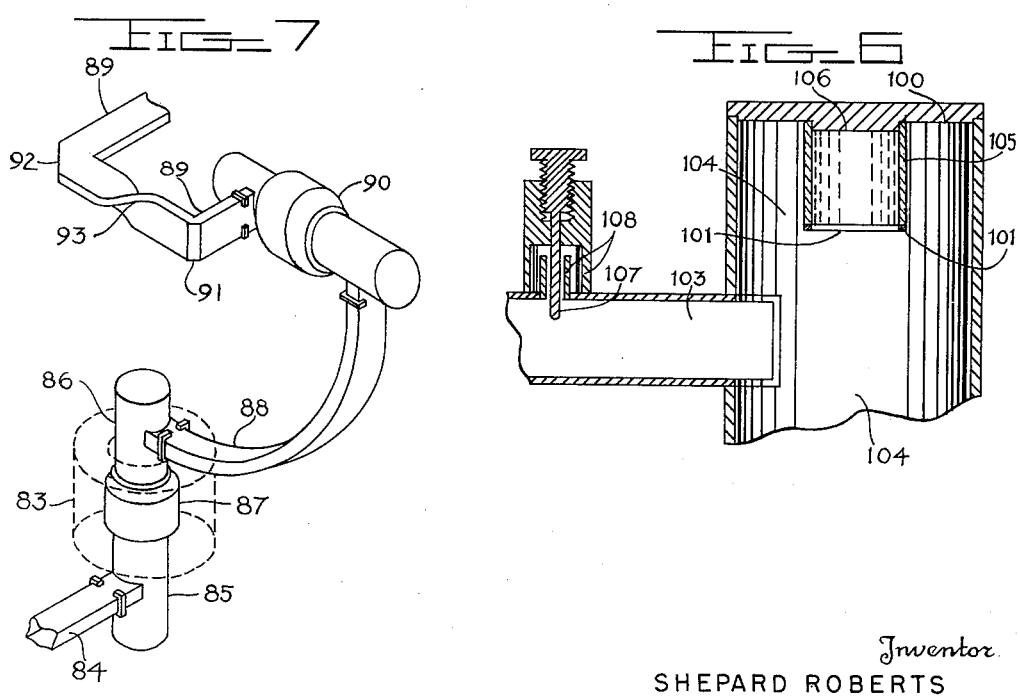
Inventor
SHEPARD ROBERTS
By  J. J. Fitzgerald
Attorney Patented June 27, 1950

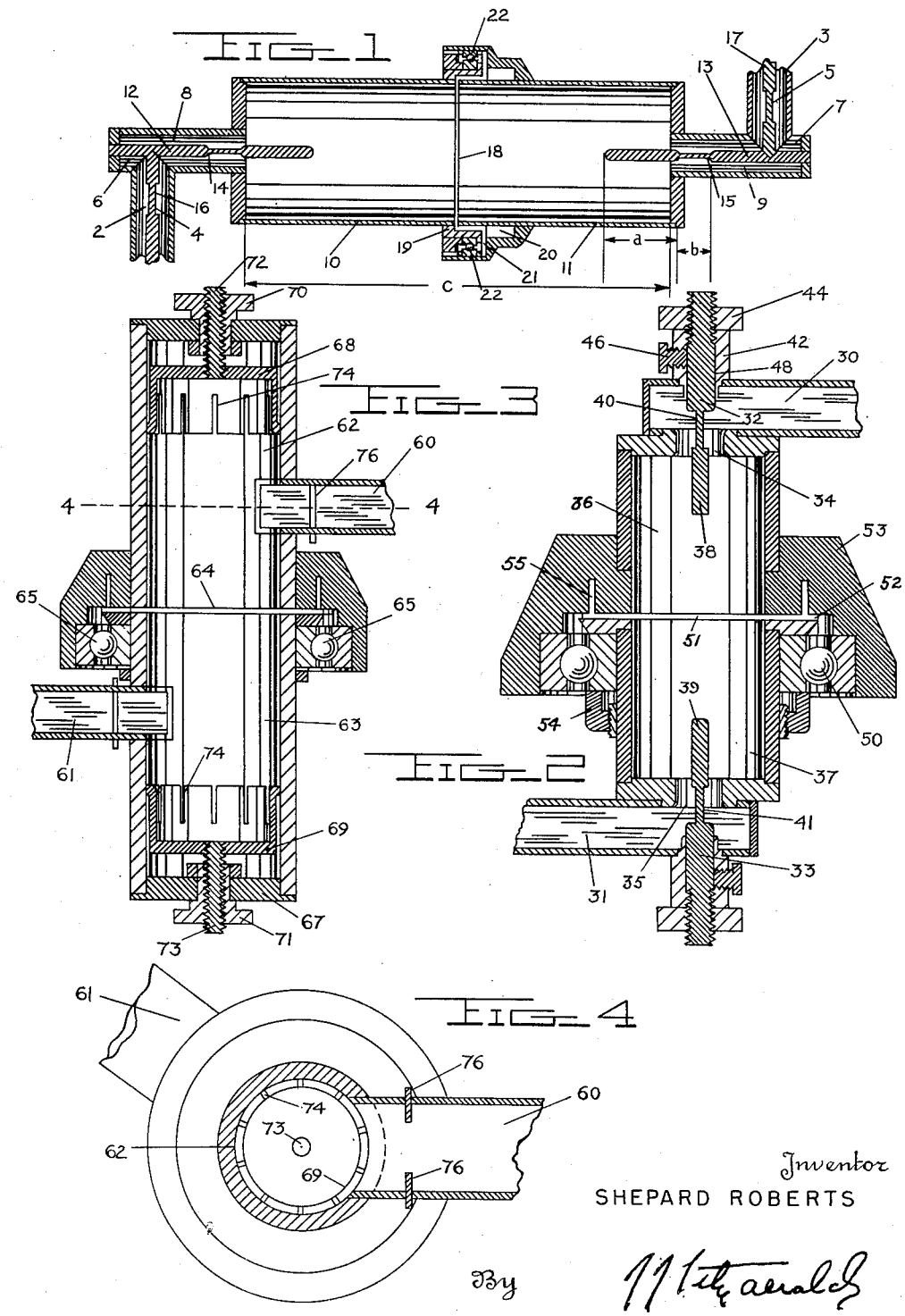

2,513,205

UNITED STATES PATENT OFFICE 2,513,205

ROTATABLE JOINT FOR RADIO WAVE GUIDE SYSTEMS

Shepard Roberts, Cambridge, Mass., assignor, by mesne assignments, to the United States of America as represented by the Secretary of the Navy Application November 19, 1943, Serial No. 510,990

5 Claims. (Cl. 178—44)

This invention relates to apparatus for conveying oscillatory electric energy of high radio frequencies from one location to another and more particularly to conveying such energy from a relatively fixed location to an apparatus which is rotatable relative to said fixed location.

The provision of joints in radio-frequency transmission means, which means may be generally designated as wave guides, for permitting relative rotation of the various pieces of apparatus connected by said wave guides is an important matter in connection with radio-echo location and detection apparatus employing steerable or continuously scanning directive antenna systems. Various types of such rotating joints have been developed for coaxial conductor wave guides but in general the rotating joints employing electrical contacts across which radio-frequency currents must flow have operated only with the occurrence of undesirable power losses and the rotating joints in which the presence of sliding contacts is avoided have involved a certain amount of complication of design. Particularly at the higher frequencies, such for example as the frequencies higher than about 5 or 6 thousand megacycles, rotating joints of the types heretofore used, employing two coaxial conductors, involve considerable difficulties of construction. It is an object of this invention to provide a rotating joint for a radio-frequency wave guide system which combines simplicity of construction with efficiency of operation. In particular, it is an object of this invention to provide the rotating joint employing a hollow pipe wave guide through which the radio-frequency energy may be transmitted in the form of oscillations in an axially symmetrical mode.

In accordance with the present invention the input energy is first transformed into an axially symmetrical oscillation in a cylindrical hollow pipe wave guide. A rotating joint is then provided in the said cylindrical hollow pipe wave guide which permits relative rotation of the two parts of the said wave guide about their common axis of symmetry and finally, the energy is again transformed from the axially symmetrical mode of oscillation into another desired mode of further transmission. Apparatus of this type is particularly useful at the higher frequencies where the cross-sectional dimension of a cylindrical wave guide adapted to transmit axially symmetrical oscillations is quite convenient for construction and operation. Devices according to the present invention are also of considerable utility for apparatus operating at high power level where care must be taken to avoid voltage breakdown. The invention is illustrated in the drawing in which:

Figs. 1, 2, and 3 are longitudinal cross-sectional views respectively of three illustrative forms of apparatus embodying the present invention;

Fig. 4 is a transverse cross section of the apparatus of Fig. 3 in a plane passing through the line 4—4 of Fig. 3;

Fig. 5 is a cross-sectional view illustrating a modified form of the apparatus shown in Figs. 3 and 4;

Fig. 6 is a cross-sectional view illustrating a further modification of the form of the apparatus shown in Figs. 3 and 4; and Fig. 7 is a perspective view of an arrangement of apparatus of this invention for transferring radio-wave energy to and/or from a steerable antenna system.

Fig. 1 shows a rotating joint adapted for insertion in a system employing coaxial conductor wave guides for radio-frequency energy transfer. Figs. 2 and 3 show forms of apparatus according to the present invention for insertion in systems employing hollow pipe wave guides adapted to transmit energy in the $H_{0,1}$ mode for energy transfer in the system.

Referring to Fig. 1 coaxial-conductor wave guides connecting with the rest of the system in which the apparatus of Fig. 1 is employed are shown at 2 and 3. The apparatus is adapted for transfer of energy in both directions so that either of these coaxial-conductor wave guides may be regarded as the input line. In the form of apparatus shown in Fig. 1, the inner conductors 4 and 5 of the respective wave guides 2 and 3 are supported near the connection of the said wave guide to the rotating joint by a quarter-wave length stub line or wave guide, the stub 6 serving to support the conductor 4 and the stub 7 serving to support the conductor 5. The stubs 6 and 7 are continued in such a manner that the coaxial-conductor wave guides 2 and 3 are provided wtih stub-supported right-angle bends, the coaxial-conductor wave guide 2 connecting with the coaxial-conductor wave guide 8 and the coaxial-conductor wave guide 3 connecting with the coaxial-conductor wave guide 9. The coaxial-conductor wave guides 8 and 9 connect axially with opposite ends of a cylindrical hollow pipe wave guide (the difference between a coaxial-conductor wave guide and a cylindrical hollow pipe wave guide being essentially the absence of an inner conductor, and certain dimensional requirements for transmission in the latter). The said hollow pipe wave guide is composed of two axially aligned sections 10 and 11 which abut each other within a ball-bearing joint which is adapted to permit relative rotation of the wave guide sections 10 and 11 with respect to their common geometrical axis.

To provide for energy transfer between the coaxial-conductor wave guide 8 and the hollow pipe wave guide 10 the inner conductor 12 of the coaxial-conductor wave guide 8, which is also the inner conductor of the stub wave guide 6, is extended into the hollow pipe wave guide 10. This extension of the conductor 12 is made coaxial with the pipe wave guide 10. The inner conductor 13 of the wave guide 9 is provided with a similar axial extension into the pipe wave guide 11. The above-mentioned extension of the conductors 12 and 13 may be regarded as antennas for launching or receiving axially symmetrical oscillations in the pipe wave guides 10 and 11. The distance to which these extensions protrude into the pipe wave guides 10 and 11 indicated by the dimension $a$ on Fig. 1 is preferably about a half-wave length. In order that the sudden transition from the coaxial wave guides 12 and 13 to the hollow pipe wave guides 10 and 11 respectively should not set up energy reflection or should set up as little reflection of energy as possible, a portion of the conductors 12 and 13 is reduced in diameter as shown respectively at 14 and 15. The length of the portion of the conductors 12 and 13 which is of reduced diameter, shown on Fig. 1 by the dimension $b$ is approximately a quarter-wave length. The length of this portion of the conductor and the amount of reduction of the diameter necessary to reduce the reflections (i. e., to produce an impedance match) can be calculated to a good approximation by known methods and can in any event be determined experimentally by checking various structures by means of standing wave detectors. Similar sections of reduced diameter are shown in Fig. 1 at 16 and 17 and are designed to counteract the reflections which might be otherwise caused by the stub wave guides 6 and 7 respectively, in accordance with the principles described in the patent application of R. V. Pound, Serial No. 475,149, filed February 8, 1943, for Apparatus for Broad Band Radio Transmission, now Patent No. 2,446,982.

In order to prevent the occurrence of losses in the neighborhood of the ball-bearing joint between the hollow pipe wave guide sections 10 and 11 and to prevent energy from passing through said joint and reaching the outside of the system, an annular resonator is provided between the ball-bearing joint and the gap 18 which separates the inner conducting surfaces of the pipe wave guides 10 and 11, which resonator is adapted to provide an extremely low impedance across the gap 18 for the desired frequency of operation and frequencies almost equal to said frequency. The said annular resonator is defined by the sleeves 19 and 20 mounted respectively upon the pipes 10 and 11, the sleeve 19 defining an annular passage between it and the pipe 11 such that the length of said passage from the gap 18 to the extremity of the sleeve 19 is substantially an electrical quarter-wave length and the sleeve 20 being arranged so as to define an annular space between it and the pipe 11 having an axial length of substantially an electrical quarter-wave length and connecting with the gap 18 through the aforementioned annular space enclosed by the sleeve 19. A gap or clearance 21 may be permitted between the extremities of the sleeves 19 and 20 in order to permit free rotation of the pipes 10 and 11 relative to each other, this gap being so located because of the electrical dimensions above-mentioned that no radio-frequency voltage appears across it and no radio-frequency energy will leak out at the desired frequency of operation. Ball-bearings 22 may then be readily mounted between structures carried respectively on the sleeves 19 and 20. The annular space enclosed by the sleeve 20 is preferably of a greater transverse width than that of the gap 18 and the channel between the sleeve 19 and the pipe 11, in order that a low impedance may be established across the gap 18 for a relatively wide range of frequencies.

The diameter of the pipe wave guides 10 and 11 should be sufficiently large to permit the propagation of oscillations in the $E_0$ mode. In other words, it should be greater than 0.767 free-space wave length and preferably about 0.94 wave length is used for this diameter. Diameters as great as 0.993 wave length or greater are not preferred because they permit propagation of the $H_{1,2}$ mode as well as the $E_0$ and $H_1$ modes.

The length of the pipe wave guides 10 and 11, their combined length being shown by the dimension $c$ on Fig. 1, is not critical, in the ordinary sense, for transmitting oscillations in the $E_0$ mode, but certain values of this dimension $c$ should be avoided because at these "forbidden" values of the length dimension resonance of the $H_1$ mode of oscillation exists so that oscillations in the $H_1$ mode tend to build up and to set up reflections in the system. The length of the dimension $c$ corresponding to resonance in the $H_1$ mode may be calculated according to known methods.

When the $E_0$ mode of oscillation is excited in the cylindrical wave guides 10 and 11, the transmission of the $E_0$ mode oscillation in the axial direction is not disturbed by relative axial rotation of the wave guides 10 and 11, so that transmission between the wave guides 2 and 3 will be equally good for any position of the rotating joint. When oscillations in the $H_1$ mode occur in the cylindrical wave guides 10 and 11, as may happen when the conductors 12 and 13 are not properly centered or when other maladjustments occur, such as those permitting resonance for the $H_1$ mode, transmission will no longer be equally good for different positions of the joint because of the nonsymmetry of the $H_1$ oscillations about the axis of the wave guides 10 and 11. The presence of $H_1$ oscillations may thus be determined by a simple test and the length dimension $c$ so adjusted that it is at a value substantially different from the nearest resonance-producing length for the $H_1$ mode.

Other forms of connection between the coaxial-conductor wave guide and the cylindrical pipe wave guide 10 and 11 may be provided instead of the stub-supported right-angle arrangement shown in Fig. 1. Insulator-supported lines, for instance, could be used. The "antenna" or other coupling means used should, however, be adapted for exciting or receiving an axially symmetrical oscillation in the pipe wave guide, for which purpose the axial half-wave antenna is particularly well-adapted and is therefore preferred.

Fig. 2 shows a form of rotating joint apparatus in accordance with the present invention adapted for connection into a system employing hollow-pipe wave guides for transfer of radio-frequency energy. The wave guides shown in Fig. 2 at 30 and 31 for connection with the system in which the rotating joint is employed are shown as rectangular pipe wave guides adapted to transfer energy at a desired frequency of operation in the $H_{0,1}$ mode. The wave guides 30 and 31 are shown on the drawing so oriented that the electric vector corresponding to the $H_{0,1}$ mode of oscillation lies in the plane of the drawing in a vertical direction. When the rectangular pipe wave guides 30 and 31 are so oriented, they are adapted for the interchange of energy between oscillations in the $H_{0,1}$ mode in the wave guide and electrical oscillations in a central vertically directed conducting member 32 (a corresponding member 33 being associated with the wave guide 31) which may be designated as an antenna member.

The antenna members 32 and 33 extend completely across the wave guides 30 and 31 respectively, and, after passing through suitable apertures respectively shown at 34 and 35 in one wall of each of the respective wave guides 30 and 31, project axially into a cylindrical hollow pipe wave guide composed of two axially aligned sections 36 and 37, the antenna member 32 projecting into the wave guide 36 and the antenna member 33 projecting into the wave guide 37. The wave guides 36 and 37 are provided with a ball-bearing joint for maintaining alignment and relative axial position and permitting relative rotation about the common geometrical axis of the wave guides 36 and 37. The antenna members 32 and 33 are provided with respective antenna portions 38 and 39, each having a length of approximately an electrical half-wave length, and matching transformer portions of reduced diameter respectively shown at 40 and 41, each having a length of approximately an electrical quarter-wave length. Most of the remaining portions of the antenna members 32 and 33 are engaged in an adjustable holding device mounted on the wall of the rectangular wave guide which is farthest from the end of the cylindrical wave guide and comprising a bushing 42, an adjusting nut or knob 44, which is threaded on the antenna member 32, and finally a set screw 46. The bushing 42 is preferably provided with an extension 48 which is adapted, as by the provision of slots together with a small amount of deformation, to grip firmly the antenna member 32 where it enters into the bushing, thereby providing a good electrical contact at that location. By means of the adjusting knob 44 the axial position of the antenna member 32 may be regulated until a position is found providing for maximum energy transfer and minimum energy reflection. When such an adjustment has been experimentally determined for a particular apparatus, the adjustment may be preserved by means of the set screw 46.

Between the ball-bearing 50 and the gap 51 which separates the cylindrical wave guides 36 and 37 is provided an annular resonator for causing a low impedance to appear across the gap 51 at the desired frequency of operation and for inhibiting the transfer of energy from the gap 51 towards the ball-bearing 50 and the outside of the system. This annular resonator comprises a clearance space 52 between flanges 53 and 54 mounted respectively upon the pipes 36 and 37 and also an annular groove 55 in the flange 53. The groove 55 has an axial dimension (depth) of substantially an electrical quarter-wave length for the desired frequency of operation and it communicates with the clearance space 52 at a radial distance of substantially an electrical quarter-wave length from the mouth of the gap 51. On account of this arrangement of the electrical dimensions of the structure, a low impedance is produced across the gap 51 for the desired frequency of operation, and the propagation of radio-frequency energy along the clearance space 52 beyond the groove is inhibited. Ball-bearings 50 may then be conveniently provided between the flanges 53 and 54 at some point in the clearance space 52 which lies beyond the groove 55. In the configuration shown in Fig. 2 the ball-bearings 50 are mounted between the outside of the pipe 37 and an extension of the flange 53.

As in the case of the apparatus shown in Fig. 1, the exact length of the cylindrical wave guide 36, 37 is not critical except that the lengths at which resonance of the $H_1$ mode occurs are to be avoided. The diameter of the wave guides 36 and 37 should again be sufficiently large for permitting propagation of the $E_0$ mode of oscillation, which is the mode of axially symmetrical oscillation which can be maintained with the smallest diameter wave guide (i. e., the critical frequency is the lowest) at a given frequency. Preferably, the pipe wave guides 36 and 37 are of the diameter specified as the preferred diameter in connection with the apparatus of Fig. 1.

Fig. 3 shows another form of apparatus in accordance with the present invention for providing a rotating joint in a system employing hollow pipe wave guides for transfer of radio-frequency energy. The hollow pipe wave guides by which the rotating joint is connected to the system are again shown in the form of rectangular wave guides adapted to be excited in the $H_{0,1}$ mode with the electric vector of oscillation in the plane of the paper and vertically oriented. These rectangular wave guides are shown at 60 and 61. The wave guide 60 communicates directly with a cylindrical hollow pipe wave guide 62, the wave guide 60 being preferably oriented perpendicularly to the axis of the wave guide 62. In a similar manner, the wave guide 61 communicates directly with a cylindrical wave guide 63, the wave guide 61 being likewise preferably oriented perpendicularly to the axis of the wave guide 63. The wave guides 62 and 63 are aligned to form substantially a single cylindrical wave guide interrupted only by a narrow gap 64, a ball-bearing rotating joint, including the ball-bearings 65, being associated with the said gap to permit relative rotation of the wave guides 62 and 63 about their common geometrical axis. The gap 64 and the associated rotating joints are provided with an annular resonator similar to that shown in Fig. 2 having the function described in connection therewith.

The closed ends 66 and 67 of the respective wave guides 62 and 63 are provided with adjustable sliding closures shown respectively at 68 and 69 for adjusting the electrical length of the cylindrical wave guide system and at the same time adjusting the distance between the effective termination of the cylindrical wave guides and the junction of the cylindrical wave guide and the rectangular wave guide, as hereinafter more fully explained. The sliding closures 68 and 69 may be advanced or retracted in an axial direction by the turning of the bushings shown respectively at 70 and 71 which may be provided with a knob-like surface for manipulation and which are threaded on shafts shown respectively at 72 and 73 fixed respectively in the closures 68 and 69. The closures 68 and 69 are preferably cup-shaped as shown in Fig. 3, the inner axial dimension of the cup being approximately an electrical quarter-wave length and the direct contact between the cup and the inner surfaces of the wave guide 62 or 63 respectively being limited to the neighborhood of the rim of the cup, in order that the current flowing at the zone of contact may be minimized. The cups 68 and 69 are preferably provided with axial slots such as the slot shown at 74, in order that the cups 68 and 69 might be slightly deformed and thus firmly engage the inner walls of the cylindrical wave guide. I have found that it is desirable to adjust the position of the cups 68 and 69 so that the distance from the terminal or bottom surface of the cup to the junction of the rectangular and cylindrical wave guides is approximately an integral number of electrical half-wave lengths for the axially symmetrical mode of oscillation which it is desired to maintain in the cylindrical wave guide and is at the same time approximately equal to an odd number of quarter-wave lengths for the undesired $H_1$ mode of oscillation. Such a relation can readily be approximated in practice with wave guides of the preferred diameter of 0.94 wave length. At the same time, I prefer to adjust the length of the wave guides 62 and 63 so that with the foregoing adjustment the total length between the terminal surfaces of the cups 68 and 69 will fall at some value substantially different from the length corresponding to resonance for the $H_1$ mode. Suppression of the $H_1$ mode is somewhat more important in the device of Fig. 3 than in the device of Fig. 2 because the junction through which energy is transferred to the cylindrical pipe is less symmetrical with respect to the latter and there is consequently a greater tendency for the $H_1$ mode to be excited.

When located as above indicated with respect to the position of the cup 68, the wave guide 60 is adapted to interchange energy with the wave guide 62 with the production of a relatively small amount of reflection at the junction. In order to reduce the amount of energy reflection at the junction still further, a small double curtain diaphragm is suitably located in the wave guide 60 not far from the said junction. A similar diaphragm is placed in the wave guide 61.

The construction of the curtain diaphragm is best illustrated in Fig. 4 which is a transverse cross section passing through the line 4—4 of Fig. 3. In Fig. 4, the wave guide 61 is shown at an obtuse angle to the wave guide 60 instead of at 180° therefrom in order to illustrate that the joint is rotatable and is adapted to transfer energy at all rotational angles. The curtain diaphragm is made up of sheet metal curtains 76 inserted in appropriate slots cut transversely in the sides of the wave guide 60 and are preferably soldered to the wave guide 60. When constructed as shown in Figs. 3 and 4, a diaphragm made of a pair of such curtains acts as an inductive susceptance connected across the wave guide 60. The extent to which the curtain 76 closes off the wave guide 60 and the distance between the curtain diaphragm and the junction between the wave guides 60 and 62 could be adjusted in accordance with known experimental methods and known theoretical considerations to produce an optimum impedance match at the desired frequency of operation, thereby reducing energy reflections at the junction.

The manner of operation of the apparatus of Fig. 3 is believed to be essentially as follows. Waves of the $H_{0,1}$ mode travelling down the rectangular wave guide 60 excite a complex type of oscillation in the wave guide 62 in the neighborhood of the junction of a wave guide 60 and 62. This complex oscillation is believed to have components of various modes, including especially the $E_0$ mode. The diameter of the wave guide 62 is such that only the $E_0$ and $H_1$ modes are able to propagate down the wave guides 62 and 63. The other components of the oscillation excited at the junction, being unable to transfer energy down the pipe, merely contribute a reactive effect. This reactive effect is compensated for by the curtain diaphragm 76 and is small enough so that the curtain diaphragm 76 need not introduce a very great reactive compensation. The reactive effect at the junction is thus prevented from setting up reflections in the wave guide 60. Approximately the same type of interchange of energy between the $E_0$ mode in a circular wave guide and the $H_{0,1}$ mode in a rectangular wave guide takes place in the inverse sense at the other end of the apparatus of Fig. 3. The curtain diaphragms are adapted substantially to compensate for the reactive effect at the junction for transmission through the junction in either direction.

The position of the adjustable termination 68 influences the ease with which the $E_0$ mode is excited relative to the other mode. It thus influences also the reactive effect occurring at the junction, but not sufficiently to raise a practical necessity for the adjustability of the diaphragm 76. Although it is desirable to adjust the terminations 68 and 69 with respect to the wave guides 60 and 61 respectively in a favorable position for the excitation of the $E_0$ mode relative to the undesired $H_1$ mode, the total distance between the closures 68 and 69 is not critical for the $E_0$ mode, for since the wave guides 60 and 61 are essentially matched to the wave guides 62 and 63, there will be no reflection in the $E_0$ mode in the wave guides 62 and 63 between the junctions with the wave guides 60 and 61. The junctions do not provide an impedance match for the $H_1$ mode, however, so that reflections will occur, in the general case, in the wave guides 62 and 63 if the $H_1$ mode is excited. It is therefore important not only to avoid adjustment of the closure 68 with respect to the wave guide 60 which will favor excitation of the $H_1$ mode but also to avoid distances between the closure 68 and the closure 69 adapted to build up resonance of the $H_1$ oscillation by the mutual reinforcement of reflections.

As above noted it has been found possible with an apparatus of the type shown in Fig. 3 to obtain an adjustment of the closures 68 and 69 favorable for interchange of energy between the $E_0$ mode in the circular wave guide and the $H_{0,1}$ mode in the rectangular wave guide and at the same time unfavorable for the interchange of energy between the $H_1$ mode in the circular wave guide and the $H_{0,1}$ mode in the rectangular wave guide. Such a fortunate interrelation of the wave length of the $E_0$ and $H_1$ modes cannot be expected to hold for all relations of wave guide size to wave length within the scope of the present invention, so that it is desirable to provide, in an apparatus such as that shown in Fig. 3, some means for independent control of the reflecting termination in the wave guides 62 and 63 for the $E_0$ and $H_1$ modes respectively. Such an arrangement is shown in Fig. 5.

Fig. 5 shows the front end of an apparatus of the general form shown in Fig. 3. Between the terminating closure 68 and the junction of the wave guides 62 and 60, a resonant filter ring 80 is mounted transversely with respect to the wave guide 62 upon an insulating support 81 which is adapted to position the filter ring 80 concentrically with respect to the wave guides 62. The supporting insulator 81 may conveniently be made of mica or a mica-bearing insulating material. The filter ring 80 should have a circumference equal to approximately 1.2 times the free space wave length corresponding to the desired frequency of operation. Such a ring so positioned in the wave guide 62 will cause total reflection of oscillations of the $H_1$ mode in the wave guide 62. The $E_0$ mode of oscillation will not be affected by the ring since the electric vector for the $E_0$ mode is everywhere perpendicular to the circumference of the ring. By adjusting the position of the ring by sliding the insulating structure 81 axially with respect to the wave guide 62, the ring 80 may be so positioned that oscillations of the $H_1$ mode set up at the junction of the wave guides 60 and 62 which are reflected by the ring 80 will cancel the $H_1$ mode oscillations proceeding from the said junction away from the ring 80, thereby inhibiting or even preventing the propagation of $H_1$ mode oscillation down the wave guide 62. For such action the plane of the ring 80 should be approximately an electrical quarter-wave length for the $H_1$ mode away from the aforesaid junction.

In the apparatus of Fig. 5, the spacing between the filter rings at each end of the apparatus is made such as to avoid resonance for the $H_1$ mode. The length of the cylindrical wave guide system between the junctions with the respective rectangular wave guides is preferably adjusted at a value such that resonance will not take place at the desired frequency of operation for the location of the filter ring 80 which is best suited to provide mutual cancellation of the $H_1$ oscillations reflected from the filter ring 80 with those proceeding directly from junction to junction.

Excitation of the $H_1$ mode having been effectively inhibited by the ring 80 in the apparatus of Fig. 5, one may freely adjust the position of the terminating closure 68 (which reflects the $E_0$ mode) for the most favorable excitation of the $E_0$ mode. In general, this will be achieved when the distance between the aforesaid junction and the terminating wall of the closure 68 is approximately an electrical half-wave length for the $E_0$ mode.

Because of the presence of the filter ring 80, the distance between the closure 68 and the corresponding closure at the other end of the circular wave guide system is no longer sensitive to $H_1$ mode resonances. For this reason, the wave guide 62 may conveniently be provided with a permanent termination instead of an adjustable one such as that provided by the closure 68. If desired, means for manipulating the structure 81, and thereby adjusting the position of the filter ring 80 may conveniently be passed through such permanent termination.

Fig. 6 shows a slightly different form of apparatus constructed according to the same principles as the apparatus of Fig. 5. In this form of apparatus both the terminating wall 100 and the reflecting filter ring 101 are fixed in position with respect to the junction of the rectangular wave guide 103 and the cylindrical wave guide 104. The metallic ring 101, which corresponds to the ring 80 of Fig. 5, is mounted upon a hollow cylinder 105 of an insulating material, preferably polystyrene. The cylinder 105 may be mounted in any convenient manner on the wall 100 and in Fig. 6 it is shown fitting about a slight cylindrical projection 106 the edges of which serve to position the cylinder 105. The cylinder 105 is preferably cemented to the wall 100 and its projection 106. The advantage of the axial type of mount of the reflecting ring 101 shown in Fig. 6 over the arrangement shown in Fig. 5 is that the insulating material of the support for the filter ring is arranged in a manner adapted to absorb a minimum of energy from the field of the $E_0$ mode of oscillation in the cylindrical wave guide, the electric vector of said field being radial with respect to the cylindrical wave guide. It is to be understood that an adjustable support for the ring 101 could be provided, if desired, by suitable arrangement for moving the cylinder 105 axially with respect to the wave guide 104.

In the arrangement of Fig. 6, instead of the sheet metal curtains 76 shown in Fig. 4, which produce an inductive susceptance, an adjustable loading capacitance 107 is provided in the wave guide 103 which provides a capacitive susceptance so located and of such magnitude as to produce a match for the wave guide junction. The position of the loading capacitance 107 is approximately a quarter-wave length (referring to the wave length in the wave guide 103) from the position appropriate for a curtain diaphragm such as the diaphragm 76. Because the loading capacitance 107 is adjustable, the effectiveness of impedance match obtained at the junction may be readily controlled.

The annular structure 108 surrounding the adjustable loading capacitance 107 is adapted to provide an effective low-loss radio-frequency connection between the protruding rod 107 and the adjacent wall of the wave guide 103, in the same manner as the annular structure comprising the annular groove 55 in the apparatus of Fig. 2 is adapted to provide a low impedance across the gap 51 for the desired frequency of operation.

Fig. 7 shows an arrangement of rectangular pipe wave guides together with two rotating joints constructed in accordance with the present invention, preferable in the form shown in Figs. 3, 4, and 5, which arrangement is adapted for furnishing radio-frequency energy to a continuously scanning directive antenna system. The antenna system and the mechanical arrangement for causing said antenna to rotate about azimuth and elevation axes have been omitted in order to simplify the illustration of the wave guide system, except that the position of the azimuth bearing is generally indicated by dotted lines at 83.

The rectangular wave guide 84, which is shown broken away, is adapted to lead to a radio apparatus, such as a transmitting and receiving apparatus. The wave guide 84 connects with a cylindrical wave guide 85, which in turn is connected with another cylindrical wave guide 86 through a rotating joint 87. The cylindrical wave guide 86 connects with a second rectangular wave guide 88. The junctions of the rectangular and cylindrical wave guides and the rotating joints are constructed as described above. The cylindrical wave guides 85 and 86 are vertically oriented and located within the azimuth bearing so that the wave guide 88 may revolve with the parts of the antenna system driven by the azimuth motor. The wave guide 88 connects with a third rectangular wave guide 89 through another rotating joint constituted in accordance with the present invention and indicated generally at 90. The axis of the rotating joint 90 is at right angles to the axis of the wave guides 85 and 86 and coincides with the elevation axis of the antenna system. The wave guide 89 is thus enabled to follow the motions of the antenna system both in elevation and in azimuth. The wave guide 89 is shown provided with two right-angle bends 91 and 92 and also with a quarter-twist shown at 93. The quarter-twist 93 is provided in order that the electric vector in the part of the wave guide 89 leading to the antenna system may be vertically oriented, which is to say parallel to the azimuth axis.

It will be noted that the right-angle bends 91 and 92 are provided with surfaces of the outside of each bend which are at 45° to both legs of the bend, thereby tending to act as reflectors to promote transmission of energy around the bend. It is preferred to construct the electric plane bend, such as that shown at 91, so that the narrow part of the wave guides is about 0.9 times the normal width of the guide in that dimension. It is preferred to construct magnetic plane bends, such as that shown at 92, so that the narrowest magnetic plane width has a width of about 0.95 times the normal magnetic plane width.

If desired, instead of connecting the joints 87 and 90 by the rectangular wave guide pipe 88 one may connect these joints by a cylindrical pipe forming a continuation of one of the cylindrical guide members of each joint and adapted to transmit the $E_0$ mode. With such a length of wide cylindrical pipe, however, avoidance of $H_1$ resonance becomes more difficult, especially over a range of frequencies, and bends in the pipe will tend to increase the likelihood of the $H_1$ mode being excited.

In a system of rotating joints such as that shown in Fig. 7, it is possible to adjust the length of the cylindrical wave guides and the length of the rectangular wave guide between the rotating joints so as to decrease the frequency sensitivity of the system. The length of the cylindrical wave guide may be so adjusted that for frequencies slightly different from the original design frequency the reflections set up at the terminal junctions of the rotating joint will tend to cancel each other. In this adjustment of the length of the cylindrical wave guide, it is of course important to avoid choice of any length which would permit resonance for the $H_1$ mode, as previously pointed out. The length of the wave guide 88 may further be adjusted so that frequencies slightly different from the original design frequency the sum of the reflections occurring in the rotating joint 90 will be at least in part cancelled by the resultant of the reflection occurring at the junctions in the other rotating joint apparatus. The desired length of the cylindrical wave guides and of the wave guide 88 may then be determined by an experimental approach. If desired, the length of the cylindrical wave guide may be adjusted to produce cancellation of junction reflections at a frequency on one side of the original design frequency (at which there are no junction reflections) and the length of the wave guide 88 may be provided such that the resultant rotating joints reflections will cancel completely at a frequency on the other side of the original design frequency. By the "resultant rotating joint reflection" is meant the net effect of the algebraic addition of these reflections occurring at the two terminal junctions of the rotating joints in question.

Rotating joints according to the present invention employing the $E_0$ mode of oscillation in an axially symmetrical wave guide for the transfer of oscillatory energy across the plane of relative rotation are capable of operation at good efficiency and require little attention. When properly adjusted, they are not more generally frequency-sensitive than other types of rotating joints.

What I desire to claim and obtain by Letters Patent is:

1. Apparatus for transmitting radio frequency energy to or from a rotatable structure, comprising a pair of coaxially abutted cylindrical wave guide sections, structural means cooperating with each of said wave guide sections and positioned at said abutment to enable relative rotation of said wave guide sections about a common axis, input and output transmission lines coupled to respective ones of said wave guide sections at predetermined radial points on the periphery thereof, said input and output transmission lines being joined to respective opposite ends of said abutted wave guide sections, means associated with said input transmission line for translating radio frequency energy of one mode into a second mode more suitable for transmission through said wave guide sections, and means associated with said output transmission line to translate the mode of radio frequency energy from said wave guide sections into a third mode more suitable for transmission along said output transmission line.

2. Apparatus for transmitting radio frequency energy to or from a rotatable structure comprising, first and second coaxially abutted cylindrical wave guide sections, a first metallic sleeve member of slightly greater diameter than said wave guide sections conductively secured to said first section and extending parallel thereto to overlap said abutment, a second metallic sleeve of greater diameter than said first sleeve secured to said second wave guide section and extending parallel thereto to overlap said first sleeve, bearing means positioned between the overlapping areas of said sleeves, said sleeves and bearing means cooperating to provide an annular gap between said abutted sections and an annular cavity between one of said sections and both of said sleeves of a length substantially equal to a half wave length of the energy in said wave guide sections, and input and output transmission lines joined to respective opposite ends of said abutted wave guide sections.

3. Apparatus for transmitting radio frequency energy to or from a rotatable structure, which apparatus includes first and second substantially abutting cylindrical wave guide sections, said wave guide sections being coaxially aligned and adapted for relative rotation about their common axis, metallic structures secured to said first and second sections at their mutually substantially abutting ends, said metallic structures being adapted to cooperate to provide a gap between said sections communicating with said wave guides through an annular mouth and extending away from said mouth for at least an electrical quarter wave length, a branch channel or groove of a depth of an electrical quarter wave length having metallic walls and communicating with said gap through an annular junction at a distance from said mouth of an electrical quarter wave length in said gap, bearing means located between said metallic structures to provide relative rotation of said wave guide sections about said common axis, and input and output transmission lines joined to respective opposite ends of said substantially abutted wave guide sections.

4. Apparatus for transmitting radio-frequency energy of a desired approximate frequency to or from a rotatable structure, which apparatus includes two substantially abutting sections of cylindrical wave guide of a diameter greater than 0.77 and less than 0.99 times the free-space wave length of radiation of said frequency, said sections of wave guide being coaxially aligned and adapted for relative rotation about their common axis, said sections of wave guide being provided at their mutually abutting ends with metallic structures adapted to cooperate to provide a gap between said sections communicating with said wave guides through an annular mouth and extending away from said mouth for at least an electrical quarter wave length, a branch channel of a depth of an electrical quarter wave length having metallic walls and communicating with said gap through an annular junction at a distance from said mouth of an electrical quarter wave length in said gap, bearing means providing for relative rotation of said wave guides about said common axis, said bearing means being located between said structures defining said gap in or near portions of said gap farther from said mouth than said channel, means coupled to the mutually opposite ends of said sections for exciting axially symmetrical oscillations of the $E_0$ mode in said wave guides when said means is provided with radio frequency energy in the form of oscillations in another mode from a connecting wave guide, and means for receiving said axially symmetrical oscillation and transforming the energy thereof into oscillations of another mode in another connecting wave guide, said last mentioned and previously mentioned means being functionally interchangeable according to the direction of energy transmission.

5. Apparatus for transmitting radio frequency energy to or from a rotatable structure, comprising a pair of coaxially abutted cylindrical wave guide sections, structural means cooperating with each of said wave guide sections and positioned at said abutment to enable relative rotation of said wave guide sections about a common axis, said structural means comprising a first metallic sleeve member of slightly greater diameter than said wave guide sections conductively secured to one of said sections, and extended parallel thereto, and overlapping said abutment, a second metallic sleeve of greater diameter than said first sleeve secured to said other wave guide section and extended parallel thereto to overlap said first sleeve, bearing means positioned between the overlapping areas of said two sleeves, said sleeves and said bearing means cooperating to provide an annular gap between said abutted sections and an annular cavity between one of said sections and both said sleeves of substantially one-half wave length in length measured at the intermediate operative frequency of said wave guide sections, input and output transmission lines joined to respective opposite ends of said abutted wave guide sections, means associated with said input transmission line for translating radio frequency of one mode into a second mode more suitable for transmission through said wave guide sections, and means associated with said output transmission line to translate the mode of radio frequency energy from said wave guide sections into a third mode more suitable for transmission along said output transmission line.

SHEPARD ROBERTS.

REFERENCES CITED

The following references are of record in the file of this patent:

UNITED STATES PATENTS

| Number | Name | Date |
|---|---|---|
| 2,155,508 | Schelkunoff | Apr. 25, 1939 |
| 2,206,923 | Southworth | July 9, 1940 |
| 2,207,845 | Wolff | July 16, 1940 |
| 2,281,274 | Dallenbach et al. | Apr. 28, 1942 |
| 2,281,551 | Barrow | May 5, 1942 |
| 2,292,496 | Von Baeyer | Aug. 11, 1942 |
| 2,407,318 | Mieher | Sept. 10, 1946 |
| 2,433,011 | Zaleski | Dec. 23, 1947 |
| 2,434,925 | Haxby | Jan. 27, 1948 |